United States Patent [19]

Randall et al.

[11] Patent Number: 5,132,040

[45] Date of Patent: Jul. 21, 1992

[54] CHEMICAL BLOWING AGENT

[75] Inventors: David Randall, Everberg; Rik De Vos, Gent, both of Belgium

[73] Assignee: Imperial Chemical Industries PLC, London, England

[21] Appl. No.: 747,349

[22] Filed: Aug. 20, 1991

Related U.S. Application Data

[62] Division of Ser. No. 584,931, Sep. 19, 1990.

[30] Foreign Application Priority Data

Sep. 19, 1989 [GB] United Kingdom ............... 8921182

[51] Int. Cl.⁵ .................. C08G 18/00; C09K 3/00
[52] U.S. Cl. ................. 252/182.25; 252/182.24; 252/350; 521/117; 521/121; 521/125; 521/128; 521/130; 521/163; 521/172
[58] Field of Search ............ 252/182.24, 182.25, 252/350; 521/117, 121, 125, 128, 130, 163, 172

[56] References Cited

U.S. PATENT DOCUMENTS

| 2,628,945 | 2/1953 | Wayne | 260/2.5 |
| 3,224,983 | 12/1965 | D'Alello | 260/2.5 |
| 4,568,702 | 2/1986 | Lascioli | 521/112 |

FOREIGN PATENT DOCUMENTS

| 0212767 | 3/1987 | European Pat. Off. |
| 0276452 | 8/1988 | European Pat. Off. |

*Primary Examiner*—Morton Foelak
*Attorney, Agent, or Firm*—Cushman, Darby & Cushman

[57] ABSTRACT

A method for the preparation of polymeric foams which comprises reacting an organic polyisocyanate with a cyclic carbonate having at least one isocyanate-reactive substitutent attached to the carbonate ring.

2 Claims, No Drawings

CHEMICAL BLOWING AGENT

This is a division of application No. 07/584,931, filed Sep. 19, 1990.

This invention relates to polymeric foams and more especially to polymeric foams derived from organic polyisocyanates and to methods for their preparation.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

For more than thirty years, the principal blowing agents used in the production of these foams have comprised water, which reacts with the polyisocyanate to form carbon dioxide, and fully halogenated chlorofluorocarbons, especially trichlorofluoromethane, which vaporise and expand under the influence of the exothermic polymer-forming reaction.

In recent years, however, there has been increasing international concern that chlorofluorocarbons may be destroying the earth's protective ozone layer and there is general agreement that their manufacture and use should be severely restricted. Accordingly, it will be necessary in many foam formulations to replace trichlorofluoromethane, at least in part, by other blowing agents. It is not always feasible to use water as a replacement for chlorofluorocarbons because the urea residues formed by reaction between the polyisocyanate and water can lead to an undesirable level of surface friability in the foams.

It is known (Tsuzuki et al, J. Org, Chem., 25, 1009, 1960) that phenyl isocyanate reacts with ethylene carbonate with evolution of carbon dioxide to form an oxazolidone but, hitherto, this reaction has not been utilised in the production of polymeric foams.

It has now been found that certain cyclic carbonates can be used as blowing agents in isocyanate-based foam formulations.

Accordingly the present invention provides a method for the preparation of polymeric foams which comprises reacting an organic polyisocyanate with a cyclic carbonate having at least one isocyanate-reactive substituent attached to the carbonate ring.

In general, the cyclic carbonates used in the method of the invention will be alkylene carbonates having 5- or 6- membered rings and at least one active hydrogen-containing group directly or indirectly attached to a carbon atom of the alkylene residue. Especially suitable cyclic carbonates have the formula:

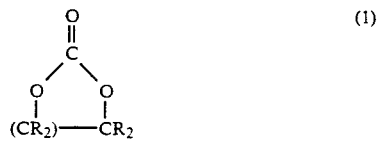

(1)

wherein n is 1 or 2 and each R, independently, is H or —(CH$_2$)$_m$—X, wherein m is 0,1 or 2 and X is —OH, —NH$_2$, —COOH or —SH, with the proviso that not every R is H.

Preferred compounds of Formula 1 have one or more of the following characteristics:
a) n is 1,
b) m is 1,
c) X is —OH, and
d) not more than one R is —(CH$_2$)$_m$—X Thus, a particularly preferred cyclic carbonate is glycerol carbonate.

Organic polyisocyanates which may be used in the method of the invention include aliphatic, cycloaliphatic and araliphatic polyisocyanates, for example 1,6-hexamethylene diisocyanate, isophorone diisocyanate, cyclohexane-1,4-diisocyanate, 4,4'-di-cyclohexylmethane diisocyanate and p-xylene diisocyanate, but especially those aromatic polyisocyanates conventionally used in the manufacture of polyurethanes and polyisocyanurate foams. Of particular importance are the tolylene diisocyanates (TDI) and diphenylmethane diisocyanates (MDI) in their various pure, modified and crude forms. Special mention may be made of the so-called MDI variants (diphenylmethane diisocyanates modified by the introduction of urethane, allophanate, urea, biuret, carbodiimide, uretonimine or isocyanurate residues) and the polyisocyanate mixtures known in the art as "crude" or "polymeric" MDI.

In performing the method of the invention the polyisocyanate may be reacted with the cyclic carbonate in the absence or presence of other isocyanate-reactive materials.

A preferred embodiment of the invention, however, comprises reacting an organic polyisocyanate with a cyclic carbonate having at least one isocyanate-reactive substituent attached to the carbonate ring and a polyol whereby to form a polyurethane foam.

Suitable polyols include those already described for use in the production of polyurethane foams.

Polyols which may be used include monomeric and polymeric polyols. Monomeric polyols include ethylene glycol, propylene glycol, butane diol, hexane diol, glycerol, trimethylol propane, pentaerythritol, sorbitol and sucrose. Polymeric polyols include polyester polyols and polyether polyols. Suitable polyols for rigid foams in general have a molecular weight of 62 to 1500 and a functionality of 2-8, especially 3-8. Suitable polyols for flexible foams and microcellular elastomers have a molecular weight of 1000-10.000 and a functionality of 2-4.

Suitable polymeric polyols have been fully described in the prior art and include reaction products of alkylene oxides, for example ethylene oxide and/or propylene oxide, with initiators containing from 3 to 8 active hydrogen atoms per molecule. Suitable initiators include polyols, for example glycerol, trimethylopropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic acids. Still further suitable polymeric polyols include hydroxyl terminated polythioethers, polyesteramides, polycarbonates, polyacetals, polyolefins and polysiloxanes.

Mixtures of polyols varying in chemical structure and/or hydroxyl number and/or functionality may be used if desired.

Isocyanate indices of from 70 to 140 will typically be used in operating the method of the invention but lower indices may be used if desired. Higher indices may also be used in conjunction with isocyanate trimerisation catalysts, for the preparation of foams containing isocyanurate linkages.

The foam-forming reaction is advantageously carried out in the presence of one or more catalysts for the reaction between a polyisocyanate and a cyclic carbonate. When the cyclic carbonate carries a hydroxyl group and/or polyols are present in the foam formulation, catalysts for urethane formation will be advantageous.

Suitable catalysts have been described in the prior art and include basic compounds such as tertiary amines and alkali metal and alkaline earth metal carboxylates. Examples of suitable catalysts include dimethylaminopyridine, N-methylmorpholine, potassium acetate and lithium carboxylates of the monoesters of polyethylene glycol, maleic acid and terephthalic acid. Other useful catalysts include 1,4-diazabicyclo [2-2-2] octane, bis(2-dimethylaminoethyl) ether, N,N-dimethylcyclohexylamine and pentamethyldiethylenetriamine.

Tin catalysts such as dibutyltin dilaurate and stannous octoate can be useful for the urethane-forming reaction.

Suitable trimerisation catalysts for the preparation of isocyanurate rigid foams are well known in the art and include quaternary ammonium hydroxides, alkali metal and alkaline earth metal hydroxides, alkoxides and carboxylates, for example potassium acetate and potassium 2-ethylehexoate, certain tertiary amines and non-basic metal carboxylates, for example lead octoate.

If desired, the cyclic carbonate may be used in conjunction with one or more other blowing agents of the types already known for isocyanate based foam systems. Thus, the foam-forming reaction mixture may contain water (typically up to 5% by weight based on the total reaction mixture) and/or volatile blowing agents, for example trichlorofluoromethane or dichlorodifluoromethane.

The total amount of blowing agent will be sufficient to provide foams of the desired density, such amounts being readily determined by the skilled person.

In addition to the ingredients already mentioned, the foam-forming reaction mixture may contain one or more other auxiliaries or additives conventional to isocyanate-based foam formulations. Such optional additives include, fire retardants, smoke suppressants, organic or inorganic fillers, thixotropic agents, dyes, pigments, mould release agents, surfactants, foam stabilisers and the like.

The method of the invention may be put into practice making use of conventional techniques. Thus known mixing methods may be used and the foams may be produced in the form of slabstock, mouldings, cavity fillings, sprayed foam, frothed foam or laminates with other materials such as hardboard, plasterboard, paper, plastics or metals. By the use of appropriate starting materials and suitable amounts of blowing agents, the polymeric foams obtained by the method of the invention may take the form of flexible or rigid foams or microcellular elastomers.

To reduce the number of component streams delivered to the final mixing apparatus, the cyclic carbonate, and optionally other blowing agents and minor additives, may be pre-mixed with one of the major components of the foam formulation. In particular, when the foam formulation contains a rigid foam or flexible foam polyol, the cyclic carbonate, for example glycerol carbonate, may be mixed with the polyol to form a useful polyol composition.

Thus, in a further aspect, the present invention provides a polyol composition comprising (a) a polyol suitable for use in the preparation of polyurethane foams, and (b) a cyclic carbonate having at least one isocyanate-reactive substituent attached to the carbonate ring, other than a composition comprising glycerol and glycerol carbonate.

Suitable polyol compositions contain from 1 to 99%, preferably from 1 to 60%, of the cyclic carbonate on a weight basis. The polyol compositions, which optionally may contain one or more of the other additives known per se in polyurethane foam formulations, may be prepared by a simple mixing process.

The invention is illustrated but not limited by the following Examples in which all parts and percentages are by weight.

EXAMPLE 1

Rigid foams were made from crude MDI and the following polyol compositions and the foams had the following free-rise density (Kg/m$^3$), cream time (sec) and end of rise time (sec):

|  | Polyol compositions | | | | | | |
|---|---|---|---|---|---|---|---|
|  | 1 | 2 | 3 | 4 | 5 | 6 | 7 |
| Polyol of OH value 485 and functionality 3.3 | — | — | — | 27.5 | — | — | — |
| Polyol of OH value 413 and functionality 2.7 | — | 28.0 | — | — | 30.7 | 31.0 | — |
| Polyol of OH value 440 and functionality 4.5 | — | — | 31.3 | — | — | — | — |
| H$_2$O | — | 1.3 | 0.7 | 1.0 | 1.3 | 1.4 | — |
| Trichlorofluoromethane | — | — | 5.4 | — | — | — | — |
| Glycerol carbonate | 28.4 | 5.7 | 5.2 | 7.6 | — | — | — |
| Propylene carbonate | — | — | — | — | 5.1 | — | — |
| Dimethyl carbonate | — | — | — | — | — | 5.0 | — |
| Di(hydroxyethylene) carbonate | — | — | — | — | — | — | 27.0 |
| Tegostab B 8404 | 0.5 | 0.5 | 0.5 | 0.4 | 0.5 | 0.5 | 0.5 |
| SFC | 1.00 | 1.22 | 1.07 | 1.15 | 1.37 | 1.27 | 0.97 |
| PMDET | 0.20 | 0.25 | 0.10 | 0.12 | 0.21 | 0.20 | 0.10 |
| DMAP | 0.15 | 0.03 | 0.03 | 0.03 | 0.03 | 0.03 | 0.03 |
| NMM | 0.6 | — | 1.3 | — | — | — | 0.2 |
| Li Y | 0.26 | — | 0.30 | — | — | — | 0.20 |
| Crude MDI | 68.9 | 63.0 | 54.1 | 62.2 | 60.8 | 60.6 | 71.0 |
| free rise density | 45 | 21 | 20 | 22 | 35 | 34 | 60 |
| cream time | 7 | 7 | 9 | 11 | 12 | 13 | 4 |
| end of rise | 23 | 45 | 80 | 91 | 95 | 92 | 21* |

*Co-formation

Tegostab is a trademark of Goldschmidt
SFC is dimethylcyclohexylamine
PMDET is pentamethyl-diethylenetriamine
DMAP is 4-dimethylaminopyridine
NMM is N-methylmorpholine
Li Y is a mixture of 25.6% monoethylene glycol, 25.6% dipropylene glycol and 48.8% of the lithium salt of the mono-ester of polyethylene glycol (MW200) and maleic anhydride.

EXAMPLE 2

A rigid foam was prepared from the following formulation:

| | |
|---|---|
| Polyol of OH value 310 and functionality 3.8 | 90 |
| EO-tipped polypropylene glycol OH value 56, 10% EO | 10 |
| Potassium acetate (50% solution in ethylene glycol) | 2.0 |
| Tegostab B 8404 | 1.5 |
| Water | 3.3 |
| Glycerol carbonate | 16.3 |
| Crude MDI | 172 |
| Cream time (s) | 20 |
| End of rise (s) | 140 |
| Free rise density (Kg/m³) | 18 |

EXAMPLE 3

A flexible foam was prepared from the following formulation:

| | |
|---|---|
| Polyol of OH value 28 and functionality 3 | 100 |
| Water | 3.0 |
| Bis(2-dimethylaminoethyl)ether | 0.1 |
| DABCO (33% indipropylene glycol) | 1.0 |
| Tegostab B 4113 | 0.75 |
| Glycerol carbonate | 10.0 |
| Suprasec VM 28 | 94.6 |
| Cream time (s) | 10 |
| End of rise (s) | 67 |
| Free rise density (Kg/m³) | 50 |

Suprasec VM 28 is a modified MDI having an NCO content of 25.0% and an average NCO functionality of 2.28. The word "Suprasec" is a trade mark, the property of Imperial Chemical Industries PLC.

EXAMPLE 4

Microcellular elastomers were prepared from the following formulations:

| | A | B | C |
|---|---|---|---|
| Polyol of OH value and functionality 3 | 100 | 100 | 100 |
| Ethylene glycol | 8 | 8 | 8 |
| DABCO (33% solution in dipropylene glycol) | 1.0 | 1.0 | 1.0 |
| Water | 0.1 | 0.1 | 0.1 |
| Trichlorofluoromethane | 15 | 10 | 10 |
| Glycerol carbonate | — | — | 5 |
| Suprasec VM 30 | 49.5 | 49.4 | 61.8 |
| Cream time (s) | 13 | 13 | 13 |
| String time (s) | 45 | 42 | 44 |
| End of rise (s) | 62 | 59 | 7 |
| Free rise density (Kg/m³) | 115 | 220 | 160 |

Suprasec VM 30 is a modified MDI having an NCO content of 28.6% and an average NCO funtionality of 2.30.

What is claimed is:
1. A polyol composition comprising:
   a) a polyol
   b) a cyclic carbonate having at least one isocyanate-reactive substitutent attached to the carbonate ring, other than a composition comprising glycerol and glycerol carbonate.
2. A polyol composition according to claim 1 containing from 1 to 60% of cyclic carbonate on a weight basis.

* * * * *